United States Patent [19]
Varnon

[11] Patent Number: 4,640,044
[45] Date of Patent: Feb. 3, 1987

[54] HOOD OR COVER USED TO ERADICATE FIRE ANTS

[76] Inventor: James W. Varnon, Rte. 1, Box 181, Beeville, Tex. 78102

[21] Appl. No.: 755,856

[22] Filed: Oct. 2, 1985

[51] Int. Cl.$^4$ ............................................. A01M 1/20
[52] U.S. Cl. ................................... 43/132.1; 43/144; 126/452
[58] Field of Search .............. 43/132.1, 144; 126/440, 126/452, 451

[56] References Cited

U.S. PATENT DOCUMENTS

| | | | |
|---|---|---|---|
| 617,676 | 10/1898 | Rieke | 43/144 |
| 4,057,048 | 11/1977 | Maine | 126/440 |
| 4,136,670 | 1/1979 | Davis | 126/440 |
| 4,341,204 | 7/1982 | Bloxom | 126/440 |
| 4,370,534 | 1/1983 | Brandon | 43/132.1 |
| 4,459,970 | 7/1984 | Clee | 126/440 |

FOREIGN PATENT DOCUMENTS 0110952 7/1983 Japan ................................. 126/440

Primary Examiner—Nicholas P. Godici
Assistant Examiner—Christopher L. McKee

[57] ABSTRACT

A hood or cover is disclosed for use in eradicating ants. The hood is translucent and uses a lens shape to intensify sunlight. It is placed over an ant mound, where it raises the temperature sufficiently to kill the nest.

5 Claims, 2 Drawing Figures

HOOD OR COVER USED TO ERADICATE FIRE ANTS

BACKGROUND OF THE INVENTION

1. Field of the Invention

The present invention relates to devices which may exterminate insects, and more particularly to such devices using intensified solar radiation to eradicate ants.

2. Description of Prior Art

Most extermination means consists of poisons or pesticides which are directly applied to the bothersome insect. One alternative to this is parasitic organisms, such as fire ant mites, which attach themselves to ants and the queen, eventually destroying the entire nest. Fire ants are a particularly menacing problem in the southwestern United States, and pesticides have been found to be generally ineffective. Heretofore no device has been invented which can eradicate the entire colony using solar radiation.

Devices for intensifying solar radiation are known in the art. Most are used for greenhouses or for generating heat for industrial or household purposes. Many employ the use of a convex lens, such as that shown in U.S. Pat. No. 612,675, issued to Rieke, which is directed to insect extermination.

The obvious disadvantage of the Rieke device is its cumbersome structure. In fact, most of the aforesaid devices are extremely large and bulky, making them unsatisfactory for the simple goal of destroying an ant mound. Moreover, the preferred device would have to completely seal off the mound. It would therefore be desirable to devise a hood for collecting solar radiation which may easily be placed on an ant mound to effectively bake the nest.

SUMMARY OF THE INVENTION

Accordingly, the primary object of the present invention is to provide an ant hood which may be placed over an ant mound and raise the heat therein sufficiently to kill the ants.

Another object of the invention is to provide such an ant hood which may be easily transported and positioned into place.

Yet another object of the invention is to provide a means by which the ants so entrapped will not be able to escape.

The foregoing objects are achieved in an ant hood having a central convex dome, a pair of side handles, and a serrated lower edge.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of illustrative embodiments when read in conjunction with the accompanying drawings wherein:

DESCRIPTION OF THE PREFERRED EMBODIMENTS

Figure 1:
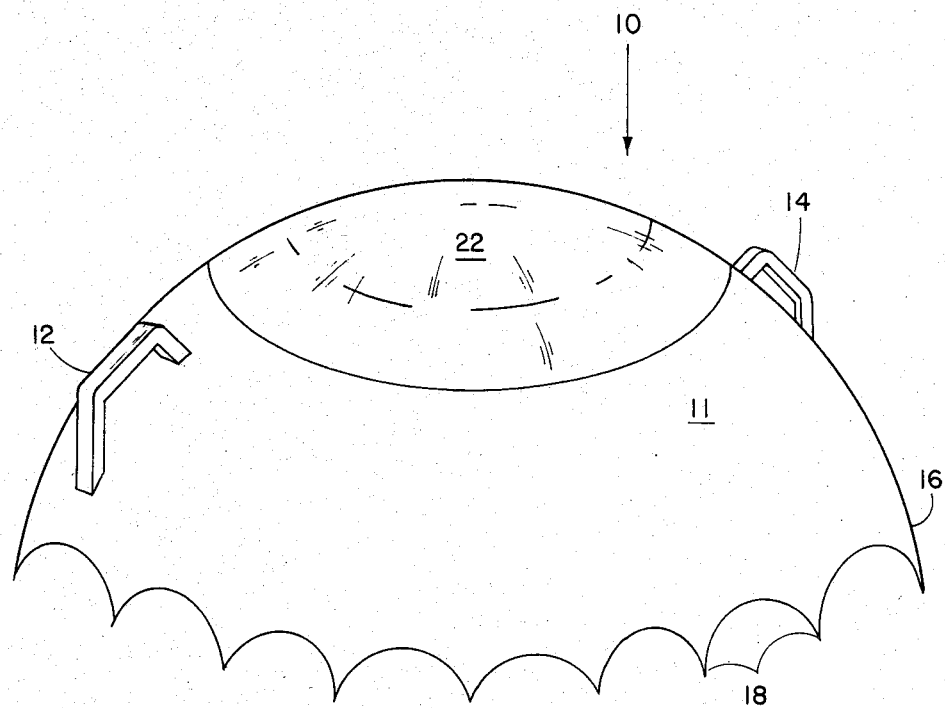
FIG. 1 is a perspective of the ant hood of the present invention.

With reference now to the figures, and in particular with reference to FIG. 1, there is depicted a perspective of the ant hood 10 of the present invention. The body of ant hood 10 is made of a translucent material 11, preferably clear plastic or glass. Ant hood 10 is generally formed as a single piece.

Figure 2:
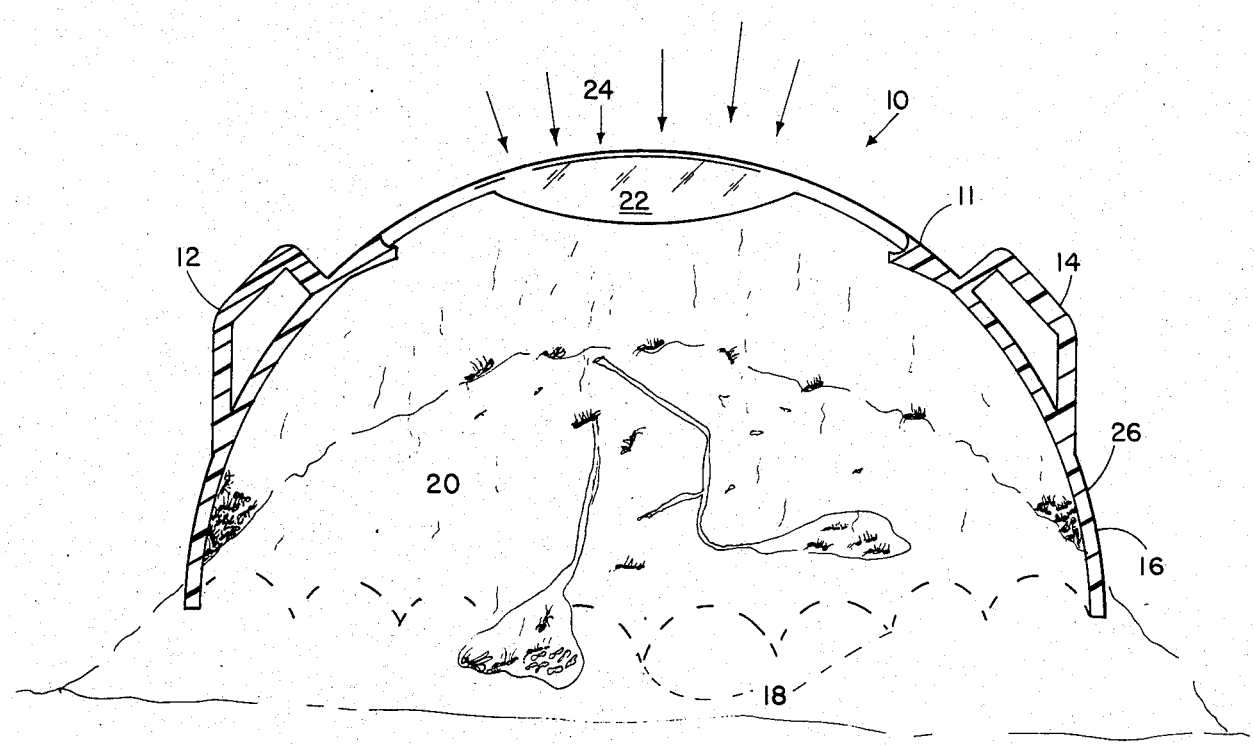
FIG. 2 is an elevational cross-section of the present invention.

With further reference to FIG. 2, the ant hood 10 may be conveniently set in place by use of handles 12 and 14. In the preferred mode of use, the lower edge 16 of the hood 10 has serrations 18 which facilitate placement of hood 10 about the ant mound 20. This also helps insure an airtight seal, and prevents any ants from escaping.

The central portion of hood 10 comprises a convex lens 22. Incoming solar radiation 24 is thereby intensified, raising the temperature inside hood 10° to 200° F. or more. Convex lens 22 may be formed as a separate element and attached to base 26.

The hood 10 can easily be set by anyone within thirty seconds and may be moved from one mound to another as needed. By agitation of hood 10, serrated edge 16 may cut through grass, weeds and soil. The excessive heat created by the hood will dehydrate the mound in one or two days, thus killing the ants, larvae, eggs, and the queen. As one skilled in the art can appreciate, the hood may be formed in various sizes to accommodate the size of ant mounds in different localities.

Although the invention has been described with reference to a specific embodiment, this description is not meant to be construed in a limiting sense. Various modifications of the disclosed embodiment, as well as alternative embodiments of the invention will become apparent to persons skilled in the art upon reference to the description of the invention. It is therefore contemplated that the appended claims will cover such modifications that fall within the true scope of the invention.

I claim:

1. An ant hood for destroying ants in a mound, comprising:
   a body having an open end, defining an inner cavity, said open end having a lower edge;
   means attached to said body for intensifying solar radiation, thereby raising the temperature within said inner cavity;
   handle means attached to said body; and
   cutting means attached to said lower edge for facilitating insertion of said lower edge into the ground surrounding said mound.

2. An ant hood as recited in claim 1 wherein said intensifying means comprises a convex lens.

3. An ant hood as recited in claim 1 wherein said cutting means comprises a serrated edge.

4. An ant hood as recited in claim 3 wherein said intensifying means comprises a convex lens.

5. An ant hood for destroying ants in a mound, comprising:
   a translucent body having a central portion incorporating a solar radiation intensifying means, a base, an outer surface, and an open end;
   said central portion of said body having a convex shape;
   at least one handle attached to said outer surface of said body;
   a serrated edge located at said open end of said body.

* * * * *